(12) United States Patent
Cerf

(10) Patent No.: US 9,216,832 B2
(45) Date of Patent: Dec. 22, 2015

(54) HEAT SHRINKABLE BUBBLE WRAPPING MACHINE

(76) Inventor: Alain Cerf, North Redington B., FL (US)

( * ) Notice: Subject to any disclaimer, the term of this patent is extended or adjusted under 35 U.S.C. 154(b) by 595 days.

(21) Appl. No.: 12/801,126

(22) Filed: May 24, 2010

(65) Prior Publication Data

US 2011/0284558 A1 Nov. 24, 2011

(51) Int. Cl.
| | |
|---|---|
| *B65B 53/02* | (2006.01) |
| *B65D 6/00* | (2006.01) |
| *B65B 21/24* | (2006.01) |
| *B32B 27/08* | (2006.01) |
| *B65B 9/06* | (2012.01) |
| *B32B 3/26* | (2006.01) |
| *B65B 11/58* | (2006.01) |
| *B65B 9/02* | (2006.01) |
| *B65B 51/30* | (2006.01) |

(52) U.S. Cl.
CPC ... *B65B 9/06* (2013.01); *B32B 3/26* (2013.01); *B32B 27/08* (2013.01); *B65B 9/026* (2013.01); *B65B 11/58* (2013.01); *B65B 21/245* (2013.01); *B65B 53/02* (2013.01); *B32B 2307/514* (2013.01); *B32B 2307/736* (2013.01); *B32B 2553/026* (2013.01); *B65B 51/303* (2013.01)

(58) Field of Classification Search
USPC .................................................. 53/442, 557
See application file for complete search history.

(56) References Cited

U.S. PATENT DOCUMENTS

| | | | | |
|---|---|---|---|---|
| 3,696,580 | A * | 10/1972 | Saltzer, Sr. ...................... | 53/442 |
| 5,623,812 | A * | 4/1997 | Todt ................................ | 53/442 |
| 5,665,456 | A * | 9/1997 | Kannankeril et al. ........ | 428/178 |
| 6,038,834 | A * | 3/2000 | Haley .............................. | 53/399 |

FOREIGN PATENT DOCUMENTS

FR 2709112 A1 * 2/1995 ............. B65D 65/40

* cited by examiner

*Primary Examiner* — Hemant M Desai
(74) *Attorney, Agent, or Firm* — Sam Silverberg

(57) ABSTRACT

This invention is to replace the need for a corrugated carton by wrapping an article with a heat shrinkable bubble wrap film. Heat shrinking the bubble wrap will allow the bubble wrap to shrink sufficiently to conform to an article such as a group of containers, e.g. bottles. Because of the inability of the bubble wrap film to tightly shrink around the containers, the containers can move and bump each other. To ensure stability, the bubble wrapped article is film wrapped with a heat shrink film and heat shrunk to provide an article that does not require a corrugated box for to ensure the integrity of the containers.

6 Claims, 4 Drawing Sheets

HEAT SHRINKABLE BUBBLE WRAPPING MACHINE

FIELD OF INVENTION

This invention relates to wrapping an article with a heat shrinkable bubble wrap film. The bubble wrapped article can be wrapped with a heat shrink film to form a tight wrap around the article.

SUMMARY OF THE INVENTION

An objective of this invention is to replace the need for a corrugated carton by wrapping an article with a heat shrinkable bubble wrap film. Heat shrinking the bubble wrap will allow the bubble wrap to shrink sufficiently to conform to an article such as a group of containers, e.g. bottles. Because of the inability of the bubble wrap film to tightly shrink around the containers, the containers can move and hump each other. To ensure stability, the bubble wrapped article is film wrapped with a heat shrink film and heat shrunk to provide an article that does not require a corrugated box for to ensure the integrity of the containers. Conventional apparatus and processes for film wrapping and heat shrinking can be used to wrap the heat shrinkable bubble wrap film around the article. The preferred apparatus and process is to uses a sleeve wrapping to insure that the entire bundle is protected by the bubble wrap film.

BACKGROUND OF THE INVENTION

Heat shrinkable film is made by making a stretchable film that when heated can be stretched and cooled in the extended state. When reheated the stretched film has a memory and will shrink back to its original state. In the manufacture of bubble wrap two stacked sheets of clear plastic film are used. One layer of the film is wrapped around a drum with holes punched in it, and suction is applied drawing one web of film into the holes that form the bubbles. The second layer of film acts as a cover because it is then laminated over the first so that when the two films are joined, they stick together and trap the air in the bubbles. During this process the films are heated and stretched. If a heat shrinkable film is used for at least the cover the bubble wrap will shrink.

Because it is attached to the film that houses the bubbles the film cannot shrink back under heat to its original size. However the shrinkage is sufficient to allow the bubble wrap to conform to an article such as a bundle of bottles but not enough to keep the bottles very tightly together. The bubble wrapped bottles need to be wrap with a conventional heat shrink film and heat shrunk to achieve the desired stability. For some applications where the article is like a cigar box where containers are not needed to be held tightly together a heat shrink bubble wrap film without a conventional heat shrink film wrap will suffice. The term article is being used to cover a unitary product or a bundle of products such as containers or bottles.

DETAILED DESCRIPTION OF THE INVENTION

Figure 1:
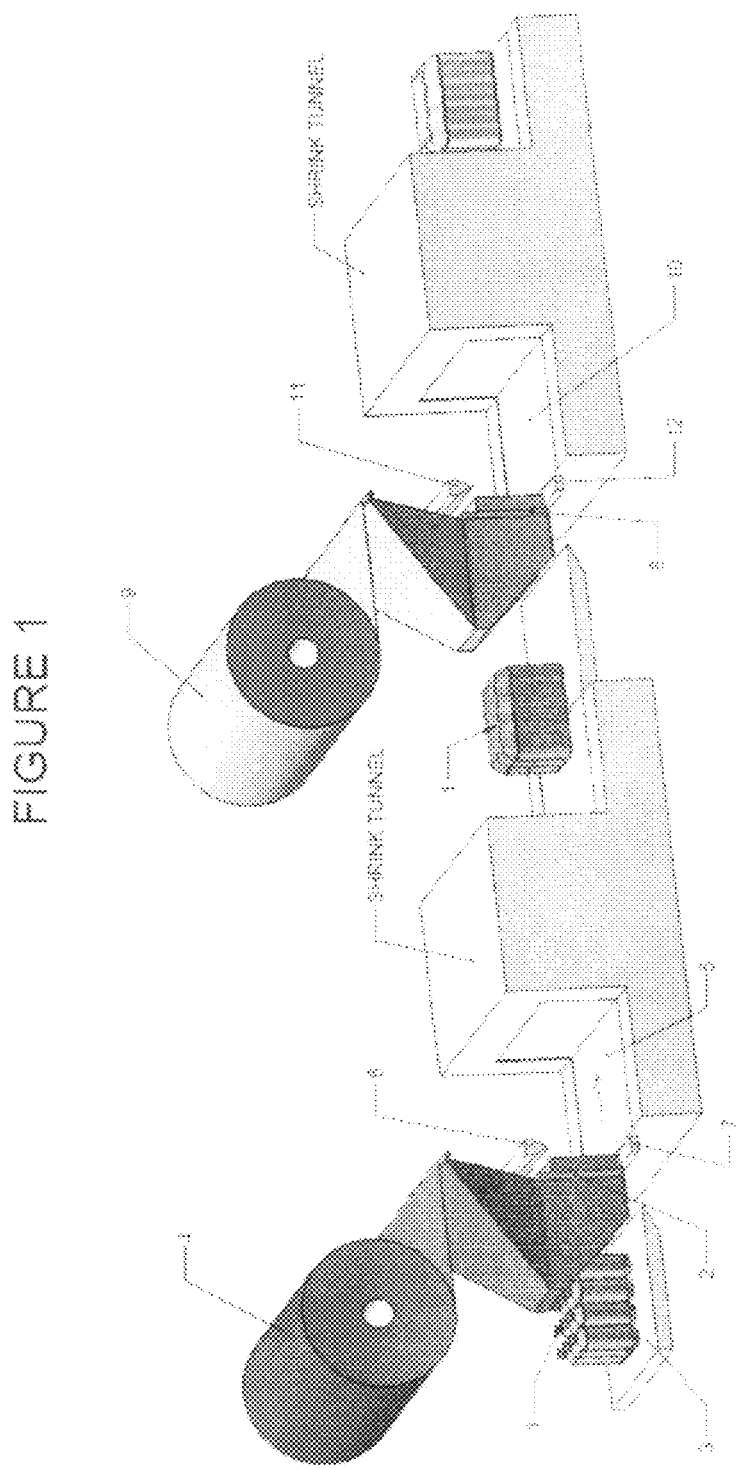
FIG. 1 shows wrapping with bubble wrap and then wrapping with heat shrink film

FIG. 1 shows a bundle of bottles 1 being conveyed on an in feed 3 into a forming head 2 which creates a sleeve when the bundle of bottles push against the bubble wrap film 4 as the bundle moves onto conveyor 5. After the bundle 1 exits the forming head the seal bar 6 pushes the bubble wrap down on plate 7 there by sealing and cutting the wrapped film. At the same time the film is sealed so a new bundle can push against the film 4. Conveyor 5 transports the bubble wrap bundle through the shrink tunnel. The bubble wrap film is heat shrunk so that the wrap conforms to the bundle. The bubble wrapped article 1 is transported into a second forming head 8 which creates a sleeve when the bundle of bottles push against the heat shrinkable film 9 as the bundle moves on conveyor 10. After the bundle 1 exits the forming head 8, the seal bar 11 pushes the bubble wrap down to plate 12 there by sealing and cutting the wrapped film. The heat sealing bar 11 seals the film 9 to form a continuous film. Conveyor 10 transports bundle through a heat shrink tunnel. The heat shrinkable film is heat shrunk to tightly hold the bottles in the bundle together. The forming head allows the bubble wrap film to provide a total closure of the bundle. The bubble film wrap film is overlapped around the bottom of the forming head and the overlap is bonded in the heat shrink tunnel.

Figure 2:
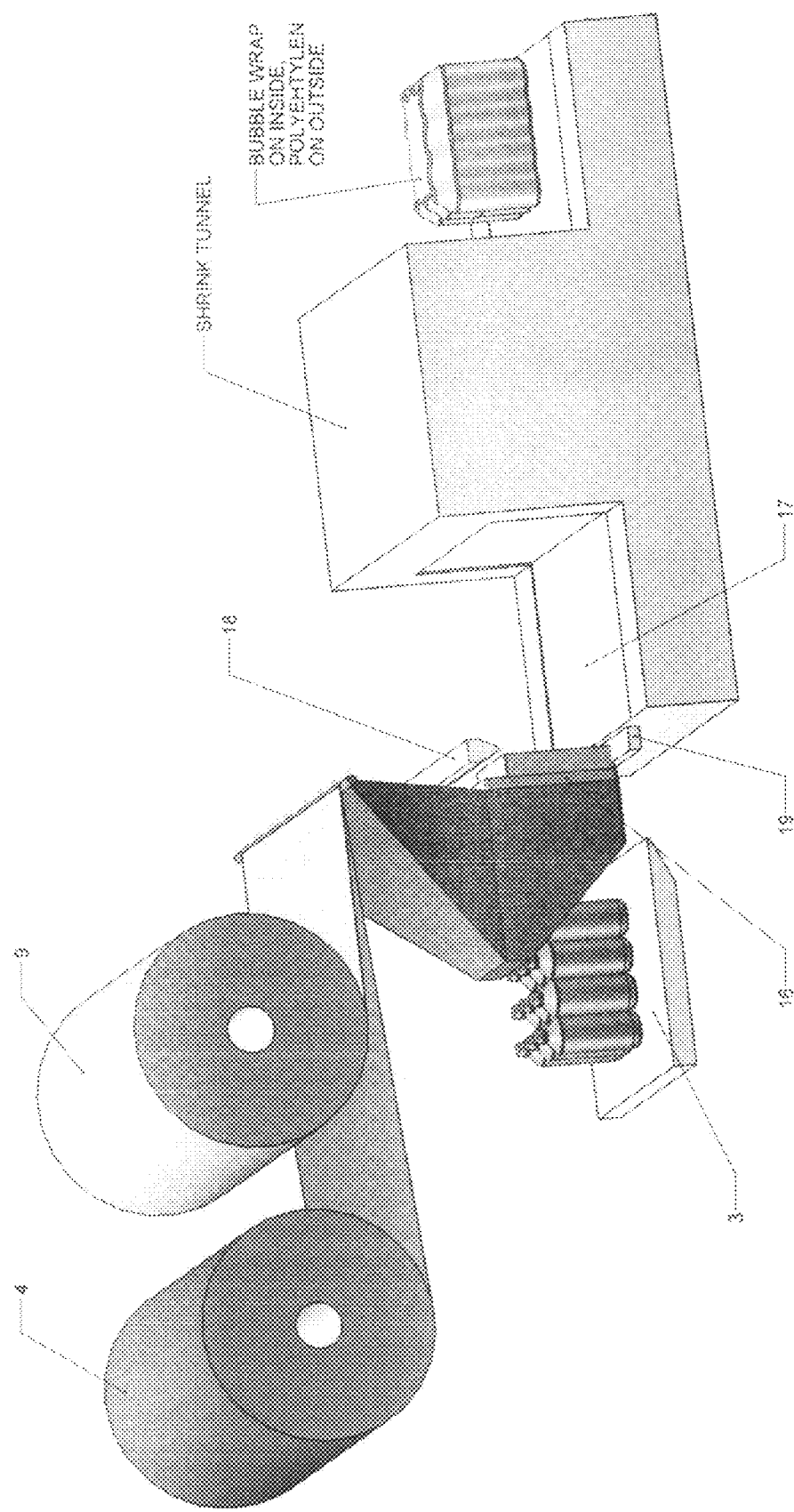
FIG. 2 shows simultaneously wrapping with bubble wrap and heat shrink film.

FIG. 2 shows an alternative where the bundle of bottles is simultaneously wrapped with the bubble wrap film 4 and the heat shrinkable film 9. The bundle of bottles 1 is conveyed on conveyor 3 into a forming head 16 which creates a sleeve when the bundle of bottles push against the bubble wrap film 4 and the heat shrinkable film 9 as the bundle moves on conveyor 17. After the bundle 1 exits the forming head the seal bar 18 pushes the bubble wrap down to plate 19 there by sealing and cutting the wrapped film. The conveyor 17 transport the bubble wrap bundle through the shrink tunnel. The bubble wrap film 4 and heat shrinkable film 9 is heat shrunk onto the bundle.

Another alternative is to omit the heat shrink film as shown in FIG. 1. Because the bubble wrap film does not shrink tightly around the article, this alternative is only suitable for articles where a tight wrap is not needed.

Figure 3:
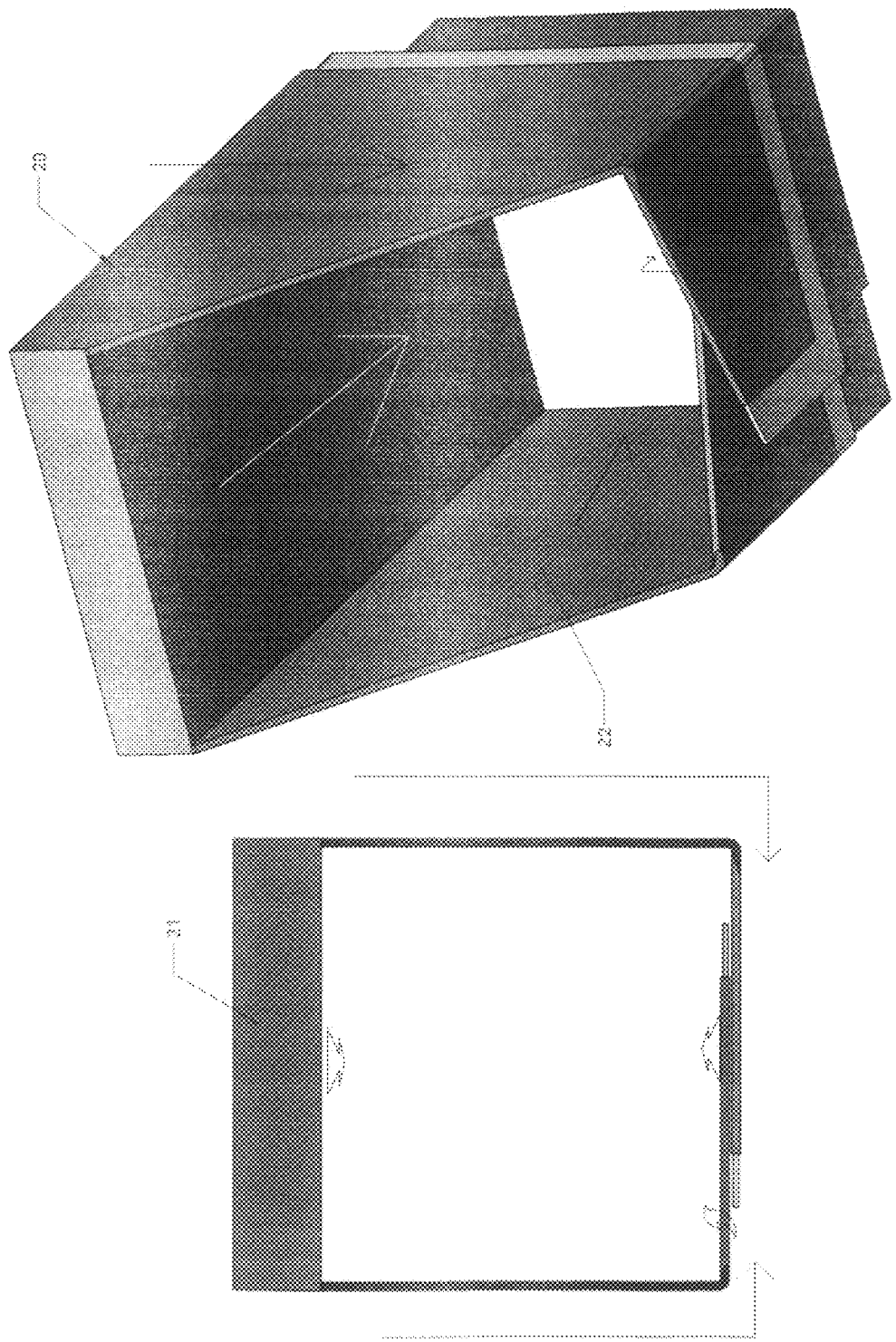
FIG. 3 shows a forming box.

FIG. 3 shows a forming box 20 with a front view 21. In the normal operation the bubble wrap film is draped over the opening 22 with the edges of the film folded back against the out side of the forming box edge and below the forming head. The edges of the film below the forming head are overlapped and are bonded during heat shrinking. When an article pushes against the plane of the bubble wrap film covering opening 22 a sleeve is formed covering the entire article. The seal bar moves down as the article exits the forming head to cut and seal the film and to enclose the bundle. Also the sealing provides a continuous film so the next bundle can push against the film so the process can be repeated. The cutting mechanism can be located further downstream so multiple bundles can be located in a sleeve and then cut and sealed into separate bundles.

Figure 4:
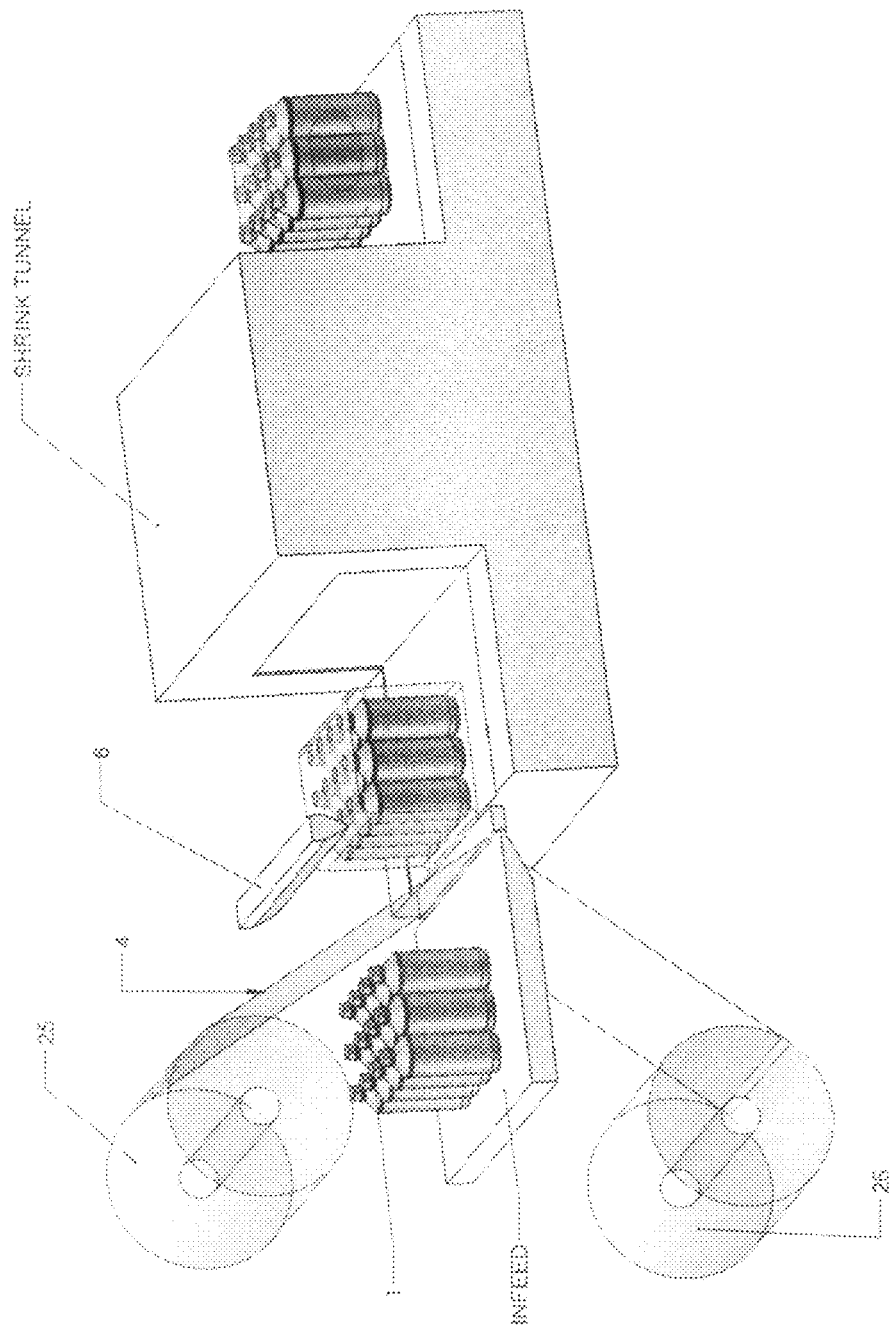
FIG. 4 shows heat shrinking bubble wrap film.

FIG. 4 shows a wrap with an open enclosure wherein the heat shrinkable wrap bubble wrap film 4 is on rolls 25 and 26. A conveyor pushes the article 1 into the plane of the film 4. As the film 4 wraps the article, the seal bar 6 moves down to cut and seal the article and to seal the film to provide a new plane of film for the next bundle. The bundle is than conveyed through the heat shrink tunnel. Afterward the heat shrunk bubble wrap film bundle can be wrapped with a heat shrinkable film to form a tight wrap around the article.

The invention claimed is:
1. A process for wrapping articles with heat shrinkable bubble wrap film comprising:
   wrapping an article with an heat shrinkable bubble wrap wherein one of the films of the bubble wrap material is a heat shrinkable film and wherein the heat shrinkable bubble wrap material is not in contact with another heat shrinkable film; and
   heat shrinking the bubble wrap article.
2. A process according to claim 1 including pushing the article against the bubble wrap film through an opening in a forming head.
3. An article produced by the process of claim 2.
4. A process for wrapping articles with heat shrinkable bubble wrap film comprising
   wrapping an article with an heat shrinkable bubble wrap wherein one of the films of the bubble wrap material is heat shrinkable film,
   heat shrinking the bubble wrap article,
   wrapping the heat shrunk bubble wrap article with a heat shrinkable film, and heat shrinking the said heat shrinkable film.
5. An apparatus for wrapping heat shrinkable bubble wrap around an article comprising,
   means for wrapping an article with a heat shrinkable bubble wrap film
   and means for heat shrinking a the heat shrinkable bubble wrap film
   means for wrapping the heat shrunk bubble wrapped article with a heat shrinkable film, and
   means for heat shrinking the heat shrinkable film.
6. An apparatus according to claim 5 wherein a sleeve is used to wrap the article.

* * * * *